United States Patent
Wu et al.

(10) Patent No.: US 10,498,423 B2
(45) Date of Patent: Dec. 3, 2019

(54) CHANNEL STATE INFORMATION FEEDBACK METHOD, PRECODING METHOD, TERMINAL DEVICE, AND BASE STATION

(71) Applicant: HUAWEI TECHNOLOGIES CO., LTD., Shenzhen, Guangdong (CN)

(72) Inventors: Lu Wu, Shenzhen (CN); Wei Han, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/186,433

(22) Filed: Nov. 9, 2018

(65) Prior Publication Data

US 2019/0081681 A1     Mar. 14, 2019

Related U.S. Application Data

(63) Continuation of application No. PCT/CN2017/079346, filed on Apr. 1, 2017.

(30) Foreign Application Priority Data

May 12, 2016  (CN) ............ 2016 1 0316773

(51) Int. Cl.
   *H04B 7/06*      (2006.01)
   *H04B 7/0456*    (2017.01)
   *H04B 7/0417*    (2017.01)
   *H04B 7/00*      (2006.01)

(52) U.S. Cl.
   CPC .......... *H04B 7/0626* (2013.01); *H04B 7/002* (2013.01); *H04B 7/0417* (2013.01); *H04B 7/0456* (2013.01); *H04B 7/0469* (2013.01); *H04B 7/0478* (2013.01); *H04B 7/0639* (2013.01)

(58) Field of Classification Search
   CPC combination set(s) only.
   See application file for complete search history.

(56) References Cited

U.S. PATENT DOCUMENTS 7,907,912 B2 *   3/2011   Nam ............... H04B 7/0408
                                                    455/69
8,699,589 B2     4/2014   Jia et al.
(Continued)

FOREIGN PATENT DOCUMENTS

CN   101969366 A    2/2011
CN   103746730 A    4/2014

OTHER PUBLICATIONS

3GPP TSG RAN WG1 Meeting #84bis, R1-162693, Samsung: "Linear combination codebook and CSI reporting", Busan, Korea, Apr. 11-15, 2016. 6 pages. XP051079834.

*Primary Examiner* — Linda Wong
(74) *Attorney, Agent, or Firm* — Womble Bond Dickinson (US) LLP

(57) ABSTRACT

A channel state information CSI feedback method is disclosed for receiving a downlink symbol from a base station, where the downlink symbol includes a pilot; obtaining a channel matrix based on the pilot included in the downlink symbol; calculating a precoding matrix based on the channel matrix and a basic codebook; generating CSI based on the precoding matrix; and transmitting an uplink symbol to the base station, where the uplink symbol carries the CSI.

10 Claims, 10 Drawing Sheets

(56) References Cited

U.S. PATENT DOCUMENTS

| | | | | |
|---|---|---|---|---|
| 8,750,401 B2* | 6/2014 | Kyeong | H04B 7/0408 | 375/267 |
| 9,621,237 B2* | 4/2017 | Kang | H04B 7/061 | |
| 9,680,535 B2* | 6/2017 | Onggosanusi | H04B 7/0404 | |
| 10,181,884 B2* | 1/2019 | Jongren | H04B 7/0456 | |
| 10,181,890 B2* | 1/2019 | Su | H04B 17/336 | |
| 2007/0155336 A1* | 7/2007 | Nam | H04B 7/0408 | 455/69 |
| 2008/0076370 A1* | 3/2008 | Kotecha | H04B 7/0417 | 455/187.1 |
| 2008/0186212 A1* | 8/2008 | Clerckx | H04B 7/0456 | 341/55 |
| 2010/0189002 A1* | 7/2010 | Choi | H04B 7/0617 | 370/252 |
| 2011/0142154 A1* | 6/2011 | Kyeong | H04B 7/0408 | 375/267 |
| 2011/0194650 A1* | 8/2011 | Lee | H04B 7/0671 | 375/316 |
| 2012/0039251 A1* | 2/2012 | Sayana | H04B 7/0639 | 370/328 |
| 2013/0129014 A1 | 5/2013 | Kim et al. | | |
| 2013/0229980 A1* | 9/2013 | Wernersson | H04B 7/0617 | 370/328 |
| 2014/0162670 A1* | 6/2014 | Choi | H04B 7/0639 | 455/450 |
| 2014/0177745 A1* | 6/2014 | Krishnamurthy | H04B 7/0413 | 375/267 |
| 2015/0171945 A1* | 6/2015 | Liu | H04B 7/0456 | 375/267 |
| 2015/0280801 A1* | 10/2015 | Xin | H04B 7/0478 | 370/329 |
| 2015/0358066 A1* | 12/2015 | Liu | H04B 7/0417 | 375/267 |
| 2015/0372732 A1* | 12/2015 | Kim | H04B 7/04 | 375/267 |
| 2016/0013845 A1* | 1/2016 | Onggosanusi | H04B 7/0469 | 375/267 |
| 2016/0065281 A1* | 3/2016 | Onggosanusi | H04B 7/0456 | 375/267 |
| 2016/0182133 A1* | 6/2016 | Onggosanusi | H04B 7/0469 | 375/267 |
| 2016/0204842 A1* | 7/2016 | Song | H04L 1/0029 | 375/267 |
| 2016/0218791 A1* | 7/2016 | Ko | H04B 7/0486 | |
| 2016/0241318 A1* | 8/2016 | Hammarwall | H04B 7/0634 | |
| 2016/0248492 A1* | 8/2016 | Prasad | H04B 7/0456 | |
| 2016/0254848 A1* | 9/2016 | Onggosanusi | H04B 7/0469 | 375/267 |
| 2016/0294454 A1* | 10/2016 | Onggosanusi | H04B 7/0456 | |
| 2016/0329945 A1* | 11/2016 | Onggosanusi | H04B 7/0626 | |
| 2017/0005712 A1* | 1/2017 | Jiang | H04B 7/0413 | |
| 2017/0126294 A1* | 5/2017 | Wernersson | H04B 7/0469 | |
| 2017/0201307 A1* | 7/2017 | Kim | H04B 7/04 | |
| 2017/0331541 A1* | 11/2017 | Kang | H04B 7/0469 | |
| 2018/0013471 A1* | 1/2018 | Gao | H04B 7/06 | |
| 2018/0041265 A1* | 2/2018 | Su | H04B 17/336 | |
| 2018/0041973 A1* | 2/2018 | Faxer | H04B 7/0617 | |
| 2018/0048364 A1* | 2/2018 | Girnyk | H04B 7/0456 | |
| 2018/0083676 A1* | 3/2018 | Wei | H04B 7/0452 | |
| 2018/0083681 A1* | 3/2018 | Faxer | H04B 7/0413 | |
| 2018/0167115 A1* | 6/2018 | Zhu | H04B 7/0478 | |
| 2018/0205438 A1* | 7/2018 | Davydov | H04B 7/0469 | |
| 2018/0212656 A1* | 7/2018 | Zhao | H04L 1/06 | |
| 2018/0212665 A1* | 7/2018 | Li | H04B 7/0469 | |
| 2019/0089441 A1* | 3/2019 | Sivahumaran | H04B 7/0478 | |

* cited by examiner

CHANNEL STATE INFORMATION FEEDBACK METHOD, PRECODING METHOD, TERMINAL DEVICE, AND BASE STATION

CROSS-REFERENCE TO RELATED APPLICATIONS

This application is a continuation of International Application No. PCT/CN2017/079346, filed on Apr. 1, 2017, which claims priority to Chinese Patent Application No. 201610316773.X, filed on May 12, 2016. The disclosures of the aforementioned applications are hereby incorporated by reference in their entirety.

TECHNICAL FIELD

The present invention relates to a multiple-antenna technology, and in particular, to a channel state information feedback method, a precoding method, a terminal device, and a base station.

BACKGROUND

Emergence of a Multiple Input Multiple Output (MIMO) technology brings about revolutionary changes to wireless communication. By deploying multiple antennas on both a transmit end device and a receive end device, the MIMO technology can provide multiple mutually independent channels simultaneously. Therefore, a data transmission rate is doubled.

FIG. 1 is a schematic diagram of an application scenario of MIMO. The application scenario shown in FIG. 1 includes a transmit end device 102 and a receive end device 104. The transmit end device 102 may be, for example, a base station, but is not limited thereto. The receive end device 104 may be, for example, a terminal device, but is not limited thereto. n(n>1) transmit antennas are configured for the transmit end device 102, and are specifically denoted as transmit antennas 1 to n. m(m>1) receive antennas are configured for the receive end device 104, and are specifically denoted as receive antennas 1 to m. In this way, a total of m×n channels exist between the n transmit antennas and the m receive antennas, as shown by solid lines between the transmit antennas 1 to n and the receive antennas 1 to m (some channels are not shown).

In an ideal situation (for example, without considering noise), the m×n channels may be indicated by using the following channel matrix:

$$H = \begin{bmatrix} h_{11} & \cdots & h_{1n} \\ \vdots & \ddots & \vdots \\ h_{m1} & \cdots & h_{mn} \end{bmatrix} \quad (1)$$

where $h_{ij}$ (1≤i≤m, 1≤j≤n) indicates a channel gain of a channel between a transmit antenna j and a receive antenna i. The receive end device 104 may determine the channel matrix by using a pilot (Pilot) transmitted by the transmit end device 102.

As shown in FIG. 2, the m×n channels may be equivalent to i channels that are mutually independent. The channels are also referred to as beams (beam), and may be obtained by using multiple technologies, for example, a precoding (Precoding) technology. The precoding technology defines a beam by using a precoding matrix (Precoding Matrix). Specifically, each column vector also referred to as a precoding vector (Precoding Vector) of the precoding matrix corresponds to one beam. An element of the column vector corresponds an antenna or antenna port (Antenna Port)) on a one-to-one basis, and is used for weighting an antenna, so that signals transmitted by the antenna overlap each other to form a beam. A maximum quantity of beams of the terminal device is equal to a quantity of singular values of the channel matrix, that is, a rank (Rank) of the channel matrix. When some singular values are excessively small (lower than a preset threshold), a quantity of the singular values that are excessively small is subtracted from the foregoing quantity. For ease of description in the specification, the rank of the channel matrix is uniformly used to indicate the quantity of the channels that are mutually independent.

The precoding technology uses a preset codebook to record the precoding matrix. The receive end device 104 selects, based on the channel matrix and based on a preset selection criterion for example, including but not limited to a maximum channel capacity criterion, a minimum mean square error criterion, or a minimum singular value criterion, an appropriate codeword in the codebook to indicate the precoding matrix. In each selection criterion, there are multiple algorithms for selection.

The existing codebook is designed for a Line Of Sight (LOS) channel, but actually most channels are Non Line of Sight (NLOS) channels. Therefore, when a precoding matrix of an NLOS channel is determined based on a LOS codebook, precision is quite limited.

SUMMARY

In view of this, a channel state information CSI feedback method needs to be provided to improve precision of an existing precoding matrix.

In addition, a precoding method is provided to improve precision of an existing precoding matrix.

In addition, a terminal device is provided to improve precision of an existing precoding matrix.

In addition, a base station is provided to improve precision of an existing precoding matrix.

According to a first aspect of the present invention, a channel state information CSI feedback method is provided and includes:

receiving a downlink symbol from a base station, where the downlink symbol includes a pilot;

obtaining a channel matrix based on the pilot included in the downlink symbol;

calculating a precoding matrix based on the channel matrix and a basic codebook;

generating CSI based on the precoding matrix; and transmitting an uplink symbol to the base station, where the uplink symbol carries the CSI.

According to a second aspect of the present invention, a precoding method is provided and includes:

transmitting a downlink symbol to a terminal device, where the downlink symbol includes a pilot;

receiving an uplink symbol from the terminal device, and extracting channel state information CSI carried in the uplink symbol, where the CSI is generated by the terminal device based on a precoding matrix, the precoding matrix is generated by the terminal device based on a channel matrix and a basic codebook, and the channel matrix is generated by the terminal device based on the pilot;

generating a precoding matrix based on the CSI; and performing, based on the precoding matrix, precoding on a modulation symbol that needs to be transmitted to the terminal device.

According to a third aspect of the present invention, a terminal device is provided and includes:

a receiving module, configured to receive a downlink symbol from a base station;

a channel state information CSI generation module, configured to obtain a channel matrix according to a pilot included in the downlink symbol, calculate a precoding matrix based on the channel matrix and a basic codebook, and generate CSI based on the precoding matrix; and a transmission module, configured to transmit an uplink symbol to the base station, where the uplink symbol carries the CSI.

According to a fourth aspect of the present invention, a base station is provided and includes:

a transmission module, configured to transmit a downlink symbol to a terminal device, where the downlink symbol includes a pilot;

a receiving module, configured to receive channel state information CSI from the terminal device, where the CSI is generated by the terminal device based on a precoding matrix, the precoding matrix is generated by the terminal device based on a channel matrix and a basic codebook, and the channel matrix is generated by the terminal device based on the pilot; and a precoding module, configured to generate a precoding matrix based on the CSI, and perform, based on the precoding matrix, precoding on a modulation symbol that needs to be transmitted to the terminal device.

In the foregoing aspects, an antenna array is configured for the base station, and the basic codebook is:

$$W = W_1 W_2,$$

where W is the basic codebook, $W_1$ is a beam codebook, a quantity of rows in the beam codebook is equal to a quantity of antennas of the base station, and $W_2$ is a weighted combining codebook;

$$W_1 = \begin{bmatrix} G & 0 \\ 0 & G' \end{bmatrix},$$

G corresponds to a first group of antennas in the antenna array, and G' corresponds to a second group of antennas in the antenna array; and $$W_2 = \begin{bmatrix} A \\ B \end{bmatrix},$$

matrices A and B are both column vectors, quantities of non-zero elements included in the column vectors A and B are both greater than 1, a quantity of elements included in the column vector A is equal to a quantity of column vectors in a matrix G, and a quantity of elements included in the column vector B is equal to a quantity of column vectors in a matrix G'.

Optionally, the antenna array includes $2N_1N_2$; antennas, both the first group of antennas and the second group of antennas include $N_1N_2$ antennas, and $$G = [g_1 g_2 \ldots g_{M_1}], g_i \in \Omega, 1 \le i \le M_1, 1 \le M_1 \le L, \text{ and}$$

$$G' = [g_1' g_2' \ldots g_{M_2}'], g_i' \in \Omega, 1 \le i \le M_2, 1 \le M_2 \le L,$$

where $\Omega$ is a preset group of $(N_1N_2 \times 1)^{th}$-order vectors, the vectors are mutually orthogonal or not orthogonal, L is a quantity of vectors and $L \ge 2N_1N_2$, the column vectors in G are mutually orthogonal or not orthogonal, and the column vectors in G' are mutually orthogonal or not orthogonal;

$$W_2 = \frac{1}{\sqrt{1+\tau^2}} \begin{bmatrix} A \\ B \end{bmatrix}, \tau > 0;$$

where $\tau$ is a value of cross polarization leakage between a polarization direction of the second group of antennas and a polarization direction of the first group of antennas;

$$A = \begin{bmatrix} \beta_1 \\ \beta_2 \\ \vdots \\ \beta_{M_1} \end{bmatrix}, \beta_i \in \delta, 1 \le i \le M_1, \text{ and}$$

$$\delta = \{\lambda_i e^{j\phi_i}, 0 \le \lambda_i \le 1, 0 \le \phi_i < 2\pi, M_1 \le i\},$$

where $\lambda_1$ and $\phi_i$ are preset values, and $\Sigma_{i=1}^{M_1} |\beta_i|^2 = 1$; and $$B = \tau e^{j\theta} \begin{bmatrix} \eta_2 \\ \vdots \end{bmatrix}, 0 \le \theta < 2\pi, \eta_i \in \sigma, 1 \le i \le M_2, \text{ and}$$

$$\sigma = \{\gamma_i e^{j\varphi_i}, 0 \le \gamma_i \le 1, 0 \le \varphi_i < 2\pi, M_2 \le i\},$$

where $\theta$ is an angle of phase rotation of the second group of antennas relative to the first group of antennas, $\gamma_i$ and $\varphi_i$ are preset values, and $\Sigma_{i=1}^{M_2} |\eta_i|^2 = 1$.

Optionally, G and G' are the same or different; and A and B are the same or different.

Optionally, the column vectors in G and G' may be selected from a same column vector set, or may be selected from different column vector sets. Orders of the column vectors from the same column vector set are the same. Orders of the column vectors from different column vector sets may be the same or may be different.

Optionally, polarization directions of all antennas in each group of antennas are the same, and the polarization direction of the first group of antennas and the polarization direction of the second group of antennas may be the same or may be different.

In the technical solutions provided by the embodiments of the present invention, multiple beams are selected for each group of antennas, weighted combining is performed to construct a new beam, and the group of antennas is weighted by using the new beam. The constructed new beam can simulate real channel conditions more precisely, and enhance precision of precoding.

DESCRIPTION OF EMBODIMENTS

With continuous development of communications theory and practice, more wireless communications technologies emerge and gradually become mature. The wireless communications technologies include but are not limited to a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an Orthogonal Frequency Division Multiple Access (Orthogonal FDMA, OFDMA) technology, a Single Carrier Frequency Division Multiple Access (Single Carrier FDMA, SC-FDMA) technology, a Space Division Multiple Access (SDMA) technology, technologies evolved and derived from the technologies, and the like. As Radio Access Technology (RAT), the wireless communications technologies are used in many wireless communications standards to construct various wireless communications systems (or networks) well known by people today, including but not limited to a Global System for Mobile Communications (GSM), CDMA2000, Wideband CDMA (Wideband CDMA, WCDMA), Wi-Fi defined in the 802.11 series standards, Worldwide Interoperability for Microwave Access (WiMAX), Long Term Evolution (LTE), LTE-Advanced (LTE-A), systems evolved from the wireless communications systems, and the like. Unless otherwise specified, the technical solutions provided by the embodiments of the present invention may be applied to the foregoing wireless communications technologies and wireless communications systems. In addition, terms "system" and "network" are interchangeable.

Figure 1:
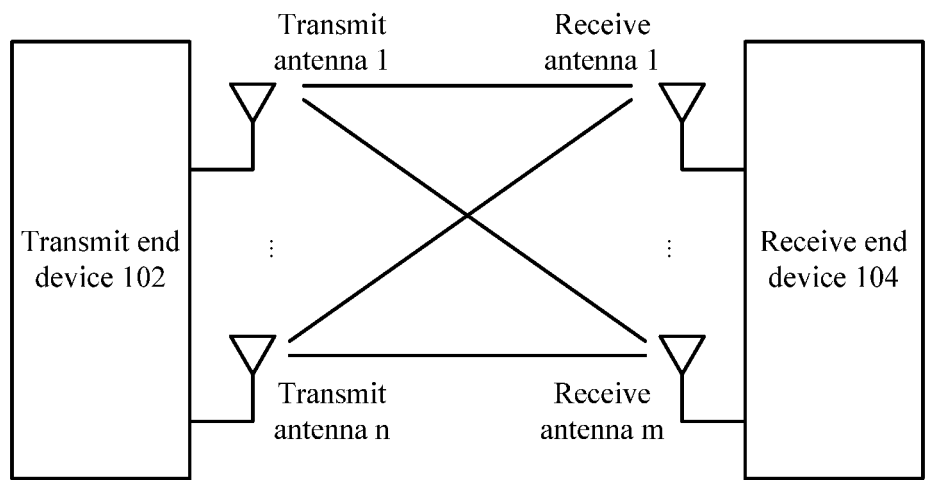
FIG. 1 is a schematic diagram of an application scenario of MIMO.
Figure 2:
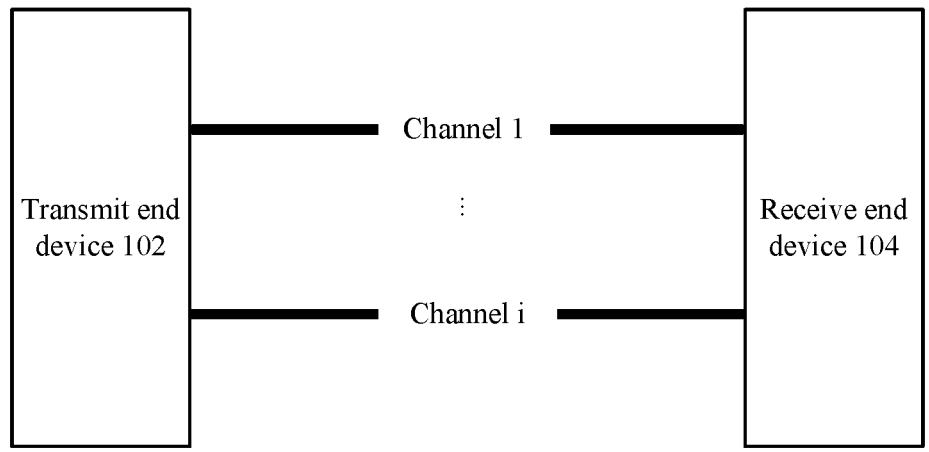
FIG. 2 is a schematic diagram of equivalent channels of MIMO.
Figure 3:
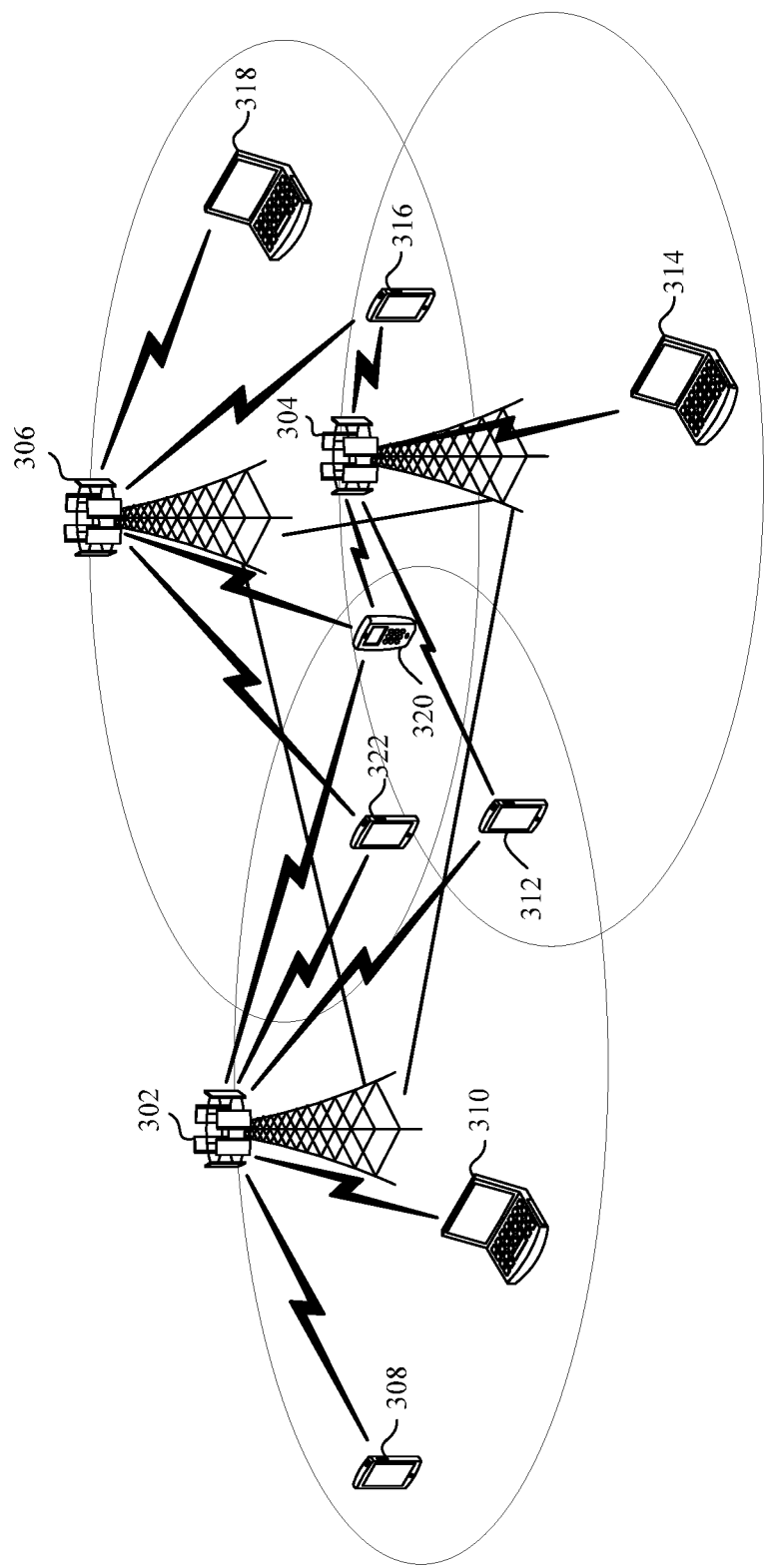
FIG. 3 is an illustrative schematic diagram of a wireless communications network according to an embodiment of the present invention.

FIG. 3 is an illustrative schematic diagram of a wireless communications network 300 according to an embodiment of the present invention. As shown in FIG. 3, the wireless communications network 300 includes base stations 302 to 306 and terminal devices 308 to 322, where the base stations 302 to 306 may communicate with each other by using backhaul (backhaul) links (as shown by direct lines between the base stations 302 to 306), and the backhaul links may be wired backhaul links (for example, optical fibers or copper cables), or may be wireless backhaul links (for example, microwave). The terminal devices 308 to 322 may communicate with the base stations 302 to 306 by using radio links (as shown by fold lines between the base stations 302 to 306 and the terminal devices 308 to 322).

The base stations 302 to 306 are configured to provide wireless access services for the terminal devices 308 to 318. Specifically, each base station provides a service coverage area (also referred to as a cell, as shown by each elliptical area in FIG. 3), and a terminal device entering the area may communicate with a base station by using a radio signal, to accept a wireless access service provided by the base station. Service coverage areas of the base stations may overlap each other, and a terminal device in an overlapping area may receive radio signals from multiple base stations. For example, as shown in FIG. 3, a service coverage area of the base station 302 overlaps that of the base station 304, and the terminal device 312 is located in the overlapping area. Therefore, the terminal device 312 may receive radio signals from the base station 302 and the base station 304. For another example, as shown in FIG. 3, a common overlapping area exists between service coverage areas of the base stations 302, 304, and 306, and the terminal device 320 is located in the overlapping area. Therefore, the terminal device 320 may receive radio signals from the base stations 302, 304, and 306.

Depending on a used wireless communications technology, the base station may also be referred to as a NodeB (NodeB), an evolved NodeB (evolved NodeB, eNodeB), an access point (Access Point, AP), or the like. In addition, according to sizes of provided service coverage areas, base stations may be classified into a macro base station providing a macro cell (Macro cell), a micro base station providing a pico cell (Pico cell), and a femto base station providing a femto cell (Femto cell). With continuous evolution of the wireless communications technology, a future base station may also use another name.

The terminal devices 308 to 318 may be various wireless communications devices having wireless communication functions, for example, including but not limited to a mobile cellular phone, a cordless telephone set, a Personal Digital Assistant (PDA), a smartphone, a notebook computer, a tablet computer, a wireless data card, a wireless modulator demodulator (Modulator demodulator, Modem), or a wearable device such as a smart watch. With emergence of an Internet of Things (IOT) technology, more devices that previously have no communication function, for example, including but not limited to a household appliance, a vehicle, a tool device, a service device, and a service facility, begin to obtain wireless communication functions by configuring wireless communications units, and therefore can access a wireless communications network and accept remote control. Because the wireless communications units are configured for the devices, the devices have the wireless communication functions, and also fall within the scope of wireless communications devices. In addition, the terminal devices 308 to 318 may also be referred to as mobile stations, mobile devices, mobile terminals, wireless terminals, handheld devices, clients, or the like.

Multiple antennas may be configured for each of the base stations 302 to 306 and the terminal devices 308 to 322 to support a MIMO technology. Further, the terminal devices 308 to 322 may not only support single-user MIMO (Single-User MIMO, SU-MIMO), but also support multi-user MIMO (Multi-User MIMO, MU-MIMO) by using an SDMA technology. Because multiple antennas are configured, the base stations 302 to 306 and the terminal devices 308 to 322 may further flexibly support a Single Input Single Output (SISO) technology, and Single Input Multiple Output (SIMO) and Multiple Input Single Output (MISO) technologies, where SIMO is also referred to as Receive Diversity (RD), and MISO is also referred to as Transmit Diversity (TD).

In addition, the base station 302 and the terminal devices 304 to 310 may perform communication by using various wireless communications technologies, for example, including but not limited to the wireless communications technologies mentioned above.

It should be noted that the wireless communications network 300 shown in FIG. 3 is used merely as an example but not intended to limit the technical solution of the present invention. A person skilled in the art should understand that, in a specific implementation process, the wireless communications network 300 further includes other devices, for example, including but not limited to a Base Station Controller (BSC). In addition, the base stations and the terminal devices may be configured according to specific requirements.

According to the technical solution provided by this embodiment of the present invention, a terminal device feeds back Channel State Information (CSI) to a base station; and the base station adjusts, based on the CSI, a radio signal that needs to be transmitted to the terminal device, so that a better receiving effect can be achieved on the terminal device side. A CSI feedback process provided by this embodiment of the present invention is hereinafter described in detail.

Figure 4:
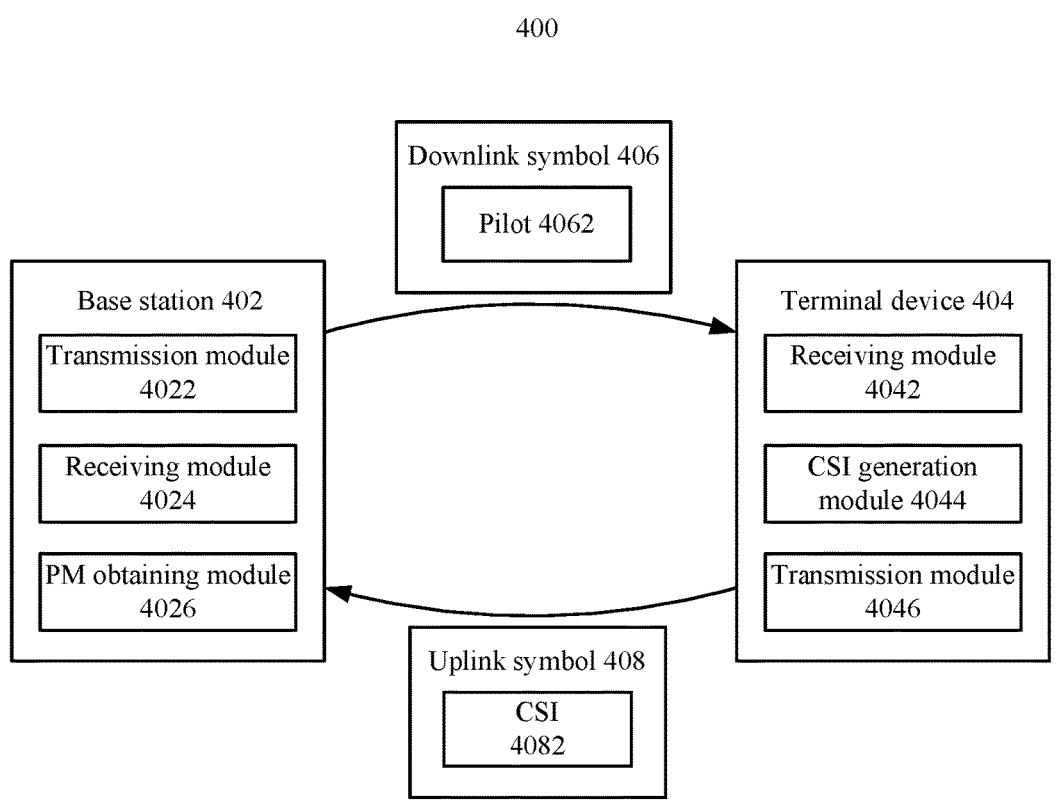
FIG. 4 is a schematic diagram of a CSI feedback process according to an embodiment of the present invention.

FIG. 4 is a schematic diagram of a CSI feedback process according to an embodiment of the present invention. The CSI feedback process is performed between a base station 402 and a terminal device 404. As shown in FIG. 4, the base station 402 specifically includes a transmission module 4022, a receiving module 4024, and a precoding module 4026. The terminal device 404 specifically includes a receiving module 4042, a CSI generation module 4044, and a transmission module 4046. The following describes the specific CSI feedback process.

The transmission module 4022 of the base station 402 transmits a downlink symbol 406, where the downlink symbol 406 carries a pilot 4062. Specifically, the downlink symbol 406 may be, for example, an orthogonal frequency-division multiplexing (OFDM) symbol, but is not limited thereto. The OFDM symbol is generally obtained by performing weighted summation on a group of subcarriers (Subcarrier), where weights of the subcarriers are to-be-transmitted modulation symbols (generally, complex numbers), including a pilot.

The receiving module 4024 of the terminal device 404 receives the downlink symbol 406.

The CSI generation module 4044 of the terminal device 404 obtains a channel matrix based on the pilot 4062 included in the downlink symbol 406.

Then the CSI generation module 4044 determines an appropriate precoding matrix based on the channel matrix and a basic codebook, and generates CSI based on the precoding matrix.

The basic codebook provided by this embodiment of the present invention is similar to a codebook in LTE-Advanced, and both use a two-level codebook structure. A first level is a long-term and/or broadband codebook $W_1$, and a second level is a short-term and/or narrowband codebook $W_2$. $W_1$ and $W_2$ are both matrices and both have multiple values. The basic codebook W is a product of matrices $W_1$ and $W_2$. Therefore, the basic codebook W is also a matrix and also has multiple values, where each value is a precoding matrix. The basic codebook W provided by this embodiment of the present invention is described in more detail hereinafter with reference to FIG. 5A to FIG. 5C.

Because the basic codebook is similar to the codebook in LTE-Advanced, the precoding matrix may be determined based on the channel matrix and the basic codebook by referring to a method for determining a precoding matrix in LTE-Advanced. The following lists several common methods to describe the process of determining the precoding matrix. A person skilled in the art should understand that, the methods are used merely as examples but are not intended to limit the scope of the present invention. In a specific implementation process, other methods may also be used to determine the precoding matrix.

A common method for determining a precoding matrix is: traversing all values of the matrices $W_1$ and $W_2$ to obtain all combinations of $W_1$ and $W_2$, performing calculation according to the combinations to obtain all values of the basic codebook W, then selecting, from all the values of the basic codebook W based on the channel matrix, a precoding matrix complying with a preset selection criterion, and adding indexes corresponding to values of $W_1$ and $W_2$ corresponding to the precoding matrix, to a corresponding precoding matrix indicator (PM Indicator, PMI) as CSI feedback. Specifically, $PMI_{W_1}$ may be used to carry indexes of the values of $W_1$, and $PMI_{W_1}$ may be used to carry indexes of the values of $W_2$.

On the other hand, the values of the matrices $W_1$ and $W_2$, change differently as the time elapses, where the values of $W_1$ change relatively slowly, and the values of $W_2$ change relatively quickly. In this way, when the precoding matrix is determined, it may be considered that only the values of one of $W_1$ and $W_2$ are changed but the values of the other remain unchanged. This can not only reduce a computation amount of the precoding matrix greatly but also reduce CSI feedback overheads. It is easily understood that, a prerequisite for implementing the foregoing solution is that change periods of $W_1$ and $W_2$ are different. Therefore, different feedback periods may be specified for $W_1$ and $W_2$. For example, because the values of $W_1$ change relatively slowly, a longer feedback period may be set for $W_1$; because the values of $W_2$ change relatively quickly, a shorter feedback period may be set for $W_2$. In addition, the values of $W_1$ and $W_2$ further need to be stored, so that when the values of one of the matrices $W_1$ and $W_2$ are changed, the values of the other matrix may still be previous values. Initial values of $W_1$ and $W_2$ may be obtained according to the previous method, or default values may be used. In a storage process, specific values may be stored, or indexes corresponding to values may be stored. Storing the specific values is hereinafter used merely as an example for description. However, a person skilled in the art should understand that the following description is also applicable to a case of storing the indexes corresponding to the values.

In some cases, if $W_1$ changes, $W_2$ also definitely changes. To be specific, when the feedback period of $W_1$ arrives, the precoding matrix needs to be determined in the foregoing manner of traversing all the values of the matrices $W_1$ and $W_2$.

On this basis, the precoding matrix may be determined by referring to the following method. When the feedback period of one of the matrices $W_1$ and $W_2$ arrives, all the values of the matrix may be traversed, and the values are combined one by one with stored values of a matrix whose feedback period has not arrived; all the values of the basic codebook W are obtained through calculation; and then a precoding matrix complying with a preset selection criterion is selected from the values based on the channel matrix, and indexes corresponding to the values of the matrix that corresponds to the precoding matrix and whose feedback period has arrived are added to a corresponding PMI as CSI feedback. In addition, the values of the matrix that corresponds to the precoding matrix and whose feedback period has arrived further need to be used to update the corresponding stored values. It is easily understood that, in this method, if the feedback periods of $W_1$ and $W_2$ arrive simultaneously, the values of $W_1$ and $W_2$ may be determined by using the previous method and added to a corresponding PMI as CSI feedback. In addition, the values need to be used to update the corresponding stored values.

As described above, each column vector of the precoding matrix corresponds to one beam. Therefore, a quantity of column vectors included in the precoding matrix is generally a maximum quantity of beams that may be allocated by the base station to the terminal device. The quantity of column vectors included in the precoding matrix is determined by a quantity of column vectors included in $W_2$. Specifically, the quantity of column vectors included in the precoding matrix is equal to the quantity of column vectors included in $W_2$. On the other hand, as described above, the maximum quantity of beams of the terminal device is equal to a rank of the channel matrix. In this way, in the process of determining the precoding matrix, a range of traversed values of $W_2$ may be determined according to the rank of the channel matrix. To be specific, only the values of $W_2$ in which the quantity of included column vectors is equal to the rank of the channel matrix are traversed, and there is no need to traverse all the values of $W_2$. Therefore, the computation amount is reduced greatly. It is easily understood that, if the traversal method needs to be used, the rank of the channel matrix needs to be calculated first. In a specific implementation process, multiple methods may be used to calculate the rank of the channel matrix, for example, including but not limited to singular value decomposition (Singular Value Decomposition, SVD).

From the foregoing description, it can be learned that, when the feedback period of $W_1$ arrives but the feedback period of $W_2$ does not arrive, the CSI includes only $PMI_{W_1}$. When the feedback period of $W_2$ arrives but the feedback period of $W_1$ does not arrive, the CSI includes only $PMI_{W_2}$. When the feedback periods of $W_1$ and $W_2$ arrive simultaneously, the CSI includes both $PMI_{W_1}$ and $PMI_{W_2}$. It is easily understood that, when the values of $W_1$ and $W_2$ are determined for the first time, the CSI may also include both $PMI_{W_1}$ and $PMI_{W_2}$.

In addition to the PMI, the CSI may include at least one of the following indicators: a channel quality indicator (Channel Quality Indicator, CQI) and a rank indicator (Rank Indication, RI).

A specific structure of the basic codebook is described in more detail hereinafter.

Then the transmission module 4046 of the terminal device 404 transmits an uplink symbol 408 to the base station 402, where the uplink symbol 408 carries CSI 4082.

The receiving module 4024 of the base station 402 receives the uplink symbol 408 and extracts the CSI 4082 carried in the uplink symbol 408.

The precoding module 4026 of the base station 402 obtains a corresponding precoding matrix based on the CSI 4082.

Because the basic codebook is similar to the codebook in LTE-Advanced, the precoding matrix may be determined based on the CSI 4082 by referring to the method for determining a precoding matrix in LTE-Advanced. Specifically, a method for determining the precoding matrix may be: when the CSI 4082 includes both $PMI_{W_1}$ and $PMI_{W_2}$, the precoding module 4026 obtains the values of $W_1$ and $W_2$ according to $PMI_{W_1}$ and $PMI_{W_2}$, and obtains the values of the basic codebook W through calculation based on the values, as the precoding matrix.

In addition, as described above, the values of the matrices $W_1$ and $W_2$ change differently as the time elapses. When the precoding matrix is determined, it may be considered that only the values of one of $W_1$ and $W_2$ are changed but the values of the other remain unchanged. Therefore, the PMI included in the CSI 4082 may be only one of $PMI_{W_1}$ and $PMI_{W_2}$. In this case, the precoding module 4026 needs to store the values of $W_1$ and $W_2$, so that when the PMI included in the CSI 4082 is only one of $PMI_{W_1}$ and $PMI_{W_2}$, values corresponding to a PMI that is not included in the CSI 4082 may still be previous values. In a storage process, specific values may be stored, or indexes corresponding to values may be stored. Storing the specific values is hereinafter used merely as an example for description. However, a person skilled in the art should understand that the following description is also applicable to a case of storing the indexes corresponding to the values.

On this basis, the precoding matrix may be determined by using the following method: extracting the PMI carried in the CSI 4082 and obtaining the values corresponding to the PMI; for the PMI that is not carried in the CSI 4082, reading the stored values corresponding to the PMI; and obtaining the values of the basic codebook W through calculation according to the values corresponding to the PMI carried in the CSI 4082 and the read values, as the precoding matrix. It should be noted that, in this case, the corresponding stored values need to be updated according to the values corresponding to the PMI carried in the CSI 4082. In addition, when the CSI 4082 carries both $PMI_{W_1}$ and $PMI_{W_2}$, the values of the basic codebook may be obtained through calculation according to the previous method, and used as the precoding matrix. In addition, in this case, the corresponding stored values need to be updated according to the values corresponding to $PMI_{W_1}$ and $PMI_{W_2}$.

After the precoding matrix is obtained, the precoding module 4026 of the base station 402 may use the precoding matrix to perform precoding on a modulation symbol that needs to be transmitted to the terminal device 404.

The base station uses the precoding matrix to perform precoding on the to-be-transmitted modulation symbol. For example, for SU-MIMO, a specific precoding process may be indicated by using the following formula:

$$\begin{bmatrix} z^0(i) \\ \vdots \\ z^{p-1}(i) \end{bmatrix} = W \begin{bmatrix} y^0(i) \\ \vdots \\ y^{v-1}(i) \end{bmatrix} \quad (2)$$

where $z^k(i)(0 \le k \le p-1)$ is a modulation symbol i obtained after precoding, and the modulation symbol will be transmitted by using an antenna port (Antenna Port) k; p is a quantity of antenna ports; $y^k(i)(0 \le k \le v-1)$ is a modulation symbol i at a layer (Layer) k, and the modulation symbol is obtained by performing layer mapping (Layer Mapping) on a codeword (codeword); v is a quantity of layers (equivalent to a quantity of beams); and W is a $p \times v$-$^{th}$ order precoding matrix. In the specification, a layer and an antenna port are interchangeable. In other words, for SU-MIMO, the precoding matrix used by the base station may be the same as the precoding matrix reported by the terminal device. However, for MU-MIMO, the base station needs to calculate a new precoding matrix based on the precoding matrix fed back by the terminal device, for example, including but not limited to a zero forcing (Zero Forcing) algorithm. Then the base station performs a precoding operation according to the new preceding matrix. Therefore, for MU-MIMO, the precoding matrix W in the foregoing formula (2) should be the new precoding matrix.

As described above, generally, the quantity of column vectors included in the precoding matrix may be the maximum quantity of beams that may be allocated by the base station to the terminal device. The base station may directly use the precoding matrix to perform precoding, or may extract some column vectors from the preceding matrix to form a new precoding matrix, and perform preceding according to the new precoding matrix.

In a specific implementation process, the base station 402 and the terminal device 404 may both include other modules. The modules are not listed one by one herein.

The foregoing briefly describes the basic codebook. The following describes the basic codebook in more detail with reference to a specific antenna array.

Figure 5A:
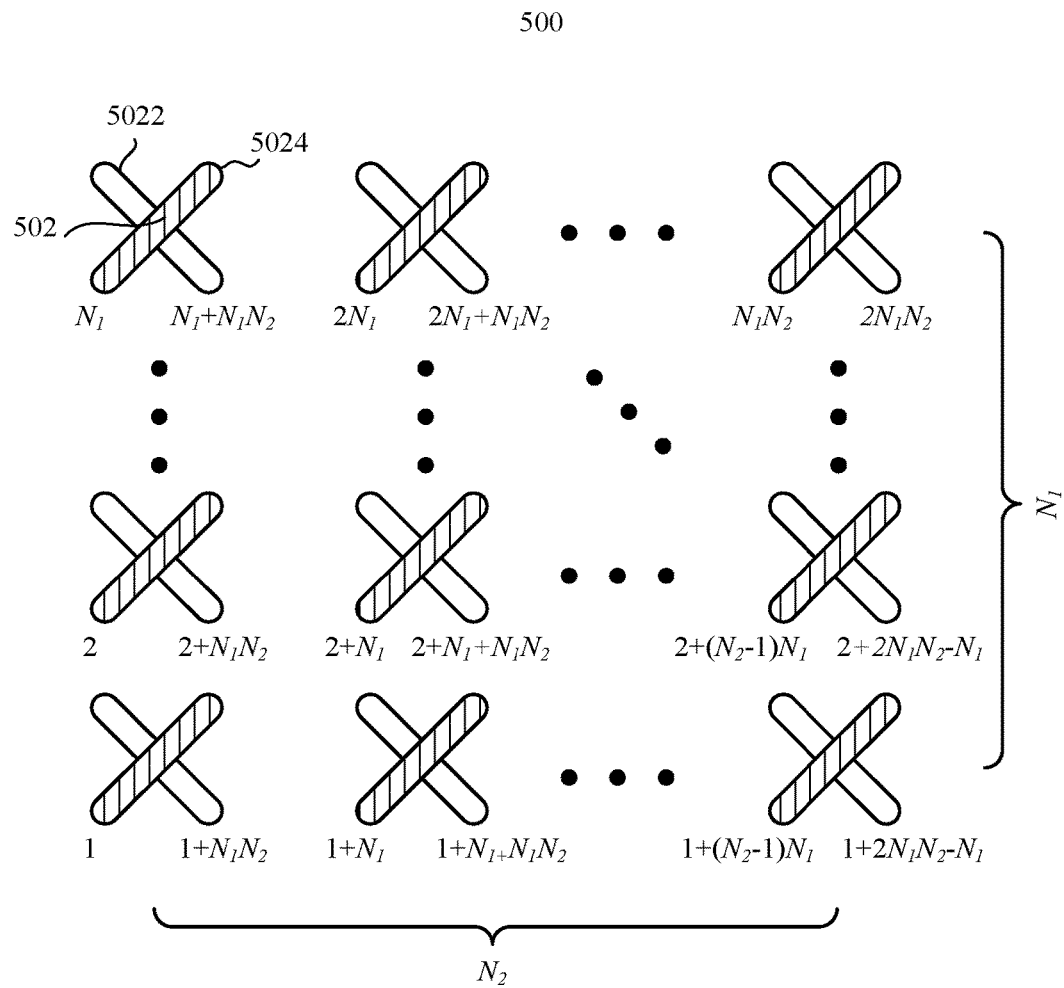
FIG. 5A is an illustrative schematic diagram of an antenna array according to an embodiment of the present invention.
Figure 5B:
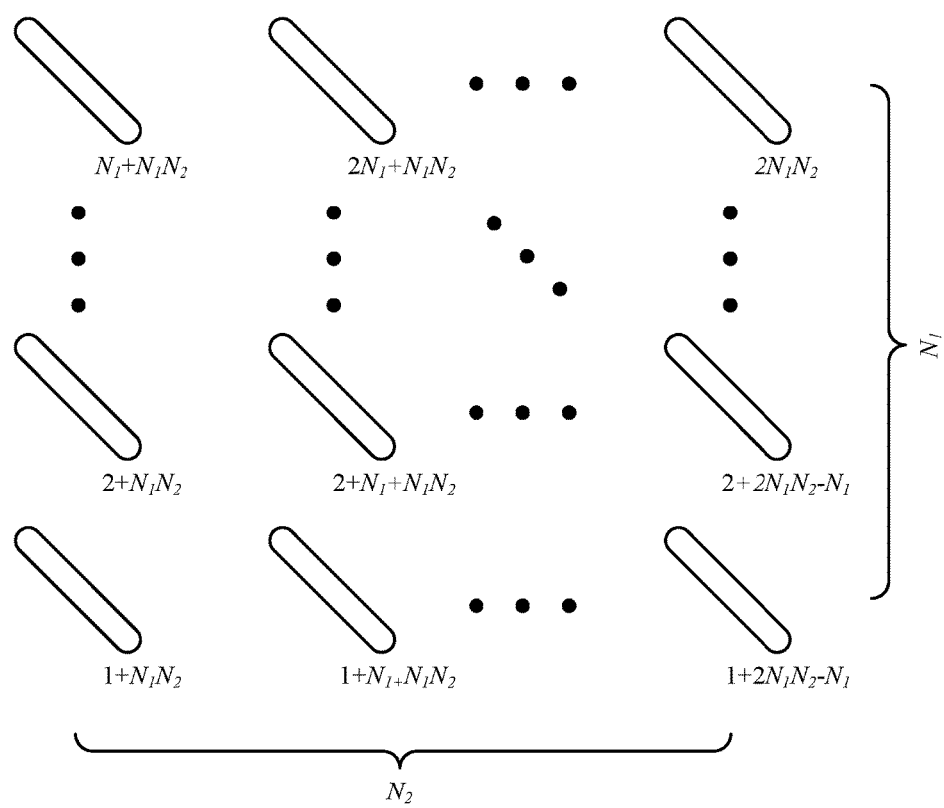
FIG. 5B is an illustrative schematic diagram of a first group of antennas in the antenna array shown in FIG. 5A.
Figure 5C:
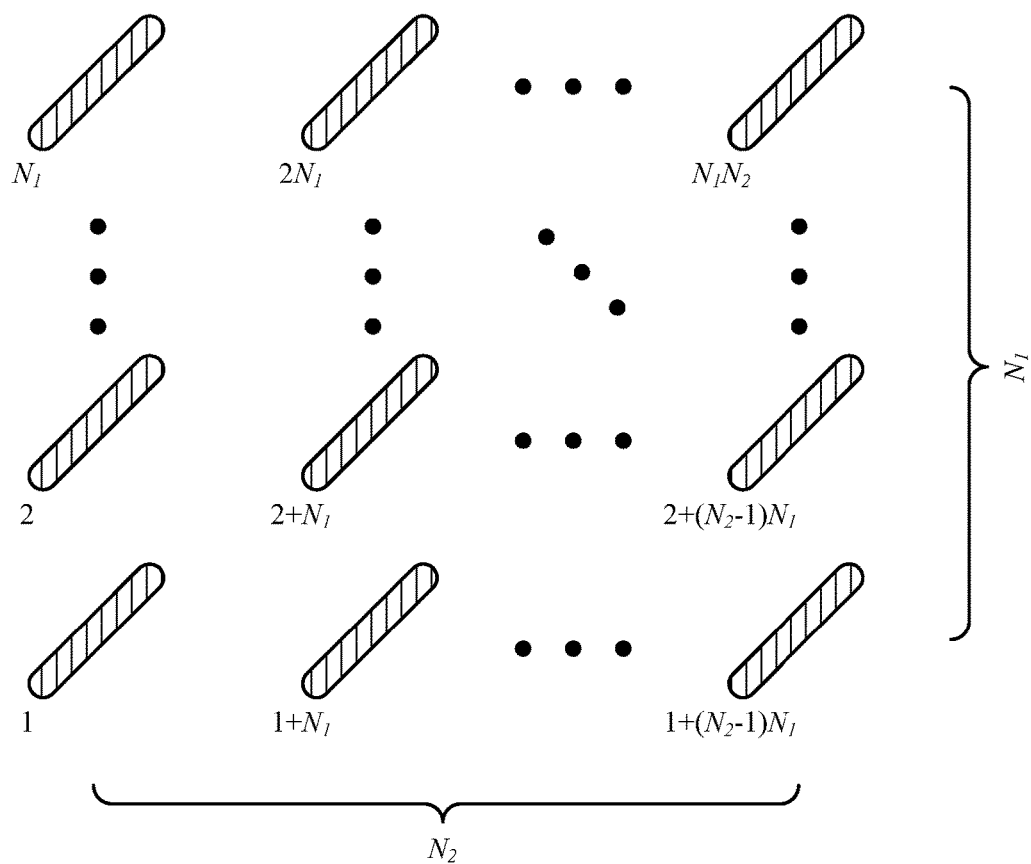
FIG. 5C is an illustrative schematic diagram of a second group of antennas in the antenna array shown in FIG. 5A.

FIG. 5A is an illustrative schematic diagram of an antenna array 500 according to an embodiment of the present invention. As shown in FIG. 5A, the antenna array 500 is a cross polarization antenna array. The antenna array specifically includes $N_1 \times N_2$ cross polarization antenna pairs 502 that are arranged in $N_1$ rows and $N_2$ columns. Each cross polarization antenna pair includes two antennas 5022 and 5024, where a polarization direction of the antenna 5022 is −45 degrees, and a polarization direction of the antenna 5024 is +45 degrees. Therefore, a difference between the polarization direction of the antenna 5022 and the polarization direction of the antenna 5024 is 90 degrees, that is, the polarization directions of the two antennas are mutually orthogonal. Antennas in the antenna array 500 may be classified into two groups according to polarization directions. A polarization direction of a first group of antennas is −45 degrees, and this group includes $N_1 \times N_2$ antennas, as shown in FIG. 5B. A polarization direction of a second group of antennas is +45 degrees, and this group also includes $N_1 \times N_2$ antennas, as shown in FIG. 5C. The antenna array 500 is generally deployed on a base station side.

With reference to the antenna array 500 shown in FIG. 5, the following describes in detail the basic codebook provided by this embodiment of the present invention.

The basic codebook W provided by this embodiment of the present invention uses a dual-codebook hierarchical structure. Specifically, the basic codebook W may be indicated by using the following formula:

$$W = W_1 W_2 \quad (3)$$

where $W_1$ is a long-term and/or broadband codebook, used to represent, for example, channel conditions within a whole system bandwidth, changes relatively slowly, and may have a very long feedback period. $W_2$ is a short-term and/or narrowband codebook, used to represent, for example, channel conditions in a subband, changes relatively quickly, and has a very short feedback period.

$W_1$ is a block diagonal matrix, and may be specifically indicated as follows:

$$W_1 = \begin{bmatrix} G & 0 \\ 0 & G' \end{bmatrix} \quad (4)$$

where $$G = [g_1 \ g_2 \ \cdots \ g_{M_1}], g_i \in \Omega, 1 \le i \le M_1, 1 \le M_1 \le L \quad (5)$$

$$G' = [g'_1 \ g'_2 \ \cdots \ g'_{M_2}], g'_i \in \Omega, 1 \le i \le M_2, 1 \le M_2 \le L \quad (6)$$

$\Omega$ is a preset group of $(N_1 N_2 \times 1)^{th}$-order vectors, the vectors may be orthogonal or not orthogonal, each vector represents one beam, and L is a quantity of vectors and $L \ge 2N_1 N_2$. In addition, each vector includes $N_1 N_2$ elements, respectively corresponding to weights of $N_1 N_2$ antennas in the first group of antennas or the second group of antennas. G is an $(N_1 N_2 \times M)^{th}$-order matrix, used to indicate a group of M beams corresponding to the first group of antennas (as shown in FIG. 5B) in the antenna array 500, and vectors corresponding to the M beams are all selected from $\Omega$. In a specific implementation, each vector may be a Discrete Fourier Transform (DFT) vector, or may be a Kronecker product (Kronecker product) vector. Because there are multiple selection results of selecting M vectors from $\Omega$, G has multiple values. Likewise, G' is an $(N_1 N_2 \times M)^{th}$-order matrix, used to indicate a group of M beams corresponding to the second group of antennas (as shown in FIG. 5C) in the antenna array 500, and vectors corresponding to the M beams are all selected from D. Because there are multiple selection results of selecting M vectors from $\Omega$, G' has multiple values. G and G' may be the same or may be different.

Generally, for an antenna array including $2N_1 N_2$ antennas, antennas in the antenna array may be classified into two groups according to a specific rule, for example, including but not limited to antenna correlation, where each group includes $N_1 N_2$ antennas. In this case, G and G' may be simply defined as two $(N_1 N_2 \times M)^{th}$-order matrices, where each column vector of the two matrices is selected from a same vector group, the vector group includes multiple $(N_1 N_2 \times 1)^{th}$-order vectors, each vector represents one beam, and a quantity of vectors in the vector group is greater than or equal to $2N_1 N_2$. As can be easily seen, G corresponds to a group of M beams corresponding to a group of antennas in the antenna array, and G' corresponds to a group of M beams corresponding to another group of antennas in the antenna array. G and G' may be the same or may be different. In addition, a person skilled in the art should understand that, the $2N_1 N_2$ antennas may not be grouped either. For example, the antenna array is a densely-arranged antenna array, but this is not limited. As can be easily seen, an order of G indicates that G corresponds to $N_1 N_2$ antennas in the $2N_1 N_2$ antennas, and locations of the $N_1 N_2$ antennas in the antenna array may be limited, or may not be limited; and an order of G' indicates that G' corresponds to the other $N_1 N_2$ antennas in the $2N_1 N^2$ antennas, and locations of the $N_1 N_2$ antennas in the antenna array may not be limited either. Still further, a quantity of beams in G may be different from a quantity of beams in G', and beams in G and G' may come from a same group of vectors (for example, $\Omega$), or may come from two different groups of vectors. Orders of vectors in a same group are the same. Orders of vectors in different groups may be the same or may be different. A quantity of vectors in each group may be set according to a requirement, for example, may be set to be greater than or equal to a quantity of beams in corresponding G or G', or may be set to be greater than or equal to a quantity of antennas in the antenna array. A sum (that is, a quantity of rows in $W_1$) of a quantity of elements included in the beams in G and a quantity of elements included in the beams in G' is equal to the quantity of antennas in the antenna array. The quantities of beams in G and G' are both greater than 1, and neither of them should be excessively large, and may be set according to a specific requirement (for example, computational complexity related to the codebook). For example, both are less than or equal to the quantity of antennas in the antenna array.

Because both G and G' have multiple values, $W_1$ also has multiple values. Each value of $W_1$ defines two groups of beams, and the two groups are defined by using a value of G and a value of G' respectively. Therefore, $W_1$ may be referred to as a beam matrix or a beam codebook. For example, G corresponds to a group of beams corresponding to the first group of antennas shown in FIG. 5B, and G' corresponds to a group of beams corresponding to the second group of antennas shown in FIG. 5C.

$W_2$ may be indicated as follows:

$$W_2 = \frac{1}{\sqrt{1+\tau^2}} \begin{bmatrix} A \\ B \end{bmatrix}, \tau > 0 \qquad (7)$$

where $$\frac{1}{\sqrt{1+\tau^2}}$$

represents a normalized coefficient, $\tau$ is a preset value of cross polarization leakage, used to represent a degree of impact of Cross-Polarized Discrimination (XPD) between the polarization direction of the first group of antennas and the polarization direction of the second group of antennas on the whole antenna array, and a specific value of $\tau$ depends on a degree of the cross polarization leakage between the polarization direction of the first group of antennas and the polarization direction of the second group of antennas.

In addition, $$A = \begin{bmatrix} \beta_1 \\ \beta_2 \\ \vdots \\ \beta_{M_1} \end{bmatrix}, \beta_i \in \delta, 1 \leq i \leq M_1 \qquad (8)$$

where $$\delta = \{\lambda_i e^{j\phi_i}, 0 \leq \lambda_i \leq 1, 0 \leq \phi_i < 2\pi, M_1 \leq i\} \qquad (9)$$

$\lambda_i$ and $\phi_i$ are preset values. Obviously, $\delta$ is a preset group of complex exponents.

In addition, $$B = \tau e^{j\theta} \begin{bmatrix} \eta_1 \\ \eta_2 \\ \vdots \\ \eta_{M_2} \end{bmatrix}, 0 \leq \theta < 2\pi, \eta_i \in \sigma, 1 \leq i \leq M_2$$

where $e^{j\theta}$ represents a preset phase rotation factor (co-phasing), used to represent a status of phase rotation of the second group of antennas relative to the first group of antennas, and $\theta$ represents an angle of phase rotation. The phase rotation factor may be denoted as $\varepsilon$. A person skilled in the art should understand that, in addition to setting $\varepsilon$ to $e^{j\theta}$, $\varepsilon$ may use another preset value. A specific value of $\varepsilon$ depends on the status of phase rotation. In addition, the value $\tau$ of cross polarization leakage is also referenced in a design of the matrix B. Therefore, a cross polarization factor $\mu$ may be used to indicate a degree of impact of cross polarization leakage between the polarization direction of the first group of antennas and the polarization direction of the second group of antennas on the matrix B. A person skilled in the art should understand that, in addition to setting $\mu$ to $\tau$, $\mu$ may use another preset value. A specific value of $\mu$ depends on the status of phase rotation. In a specific implementation process, the cross polarization factor may use a preset value.

$$\sigma = \{\gamma_i e^{j\varphi_i}, 0 \leq \gamma_i \leq 1, 0 \leq \varphi_i < 2\pi, M_2 \leq i\} \qquad (11)$$

where $\gamma_i$ and $\varphi_i$ are preset values. Obviously, $\sigma$ is a preset group of complex exponents.

As can be seen, both the matrices A and B are column vectors. In addition, the matrices A and B may be the same or may be different, and quantities of non-zero elements in the matrices A and B are both greater than 1.

In addition, for the matrix A:

$$\sum_{i=1}^{M_1} |\beta_i|^2 = 1 \qquad (12)$$

In addition, for the matrix B:

$$\sum_{i=1}^{M_2} |\eta_i|^2 = 1 \qquad (13)$$

As can be learned from the foregoing definition:

$$W = \frac{1}{\sqrt{1+\tau^2}} \begin{bmatrix} GA \\ G'B \end{bmatrix} \qquad (14)$$

Therefore, W is an $(2N_1N_2 \times 1)^{th}$-order matrix. GA is an $(N_1N_2 \times 1)^{th}$-order matrix, and $N_1N_2$ elements correspond to weights of $N_1N_2$ antennas in the first group of antennas respectively, so that a beam is formed by using the first group of antennas. GA may be understood as using the matrix A to select multiple beams from a group of M beams (denoted as G) corresponding to the first group of antennas, and performing weighted combining on the selected beams to form a new beam corresponding to the first group of antennas. A location of a non-zero element in the matrix A determines a location of a selected beam in the matrix G, and a value of the non-zero element determines a weight of the selected beam. G' is an $(N_1N_2 \times 1)^{th}$-order matrix, and $N_1N_2$ elements correspond to weights of $N_N$ antennas in the second group of antennas respectively, so that a beam is formed by using the second group of antennas. G'B may be understood as using the matrix B to select multiple beams from a group of M beams (denoted as G') corresponding to the second group of antennas, and performing weighted combining the selected beams to form a new beam corresponding to the second group of antennas. A location of a non-zero element in the matrix B determines a location of a selected beam in the matrix G', and a value of the non-zero element determines a weight of the selected beam. Therefore, $W_2$ may be referred to as a weighted combining matrix or a weighted combining codebook, where the matrix A is a weighted combining matrix corresponding to the first group of antennas, and the matrix B is a weighted combining matrix corresponding to the second group of antennas. In addition, $W_2$ represents, by using the preset value of cross polarization leakage and the cross polarization factor in the matrix B, the degree of impact of the cross polarization leakage between the polarization direction of the first group of antennas and the polarization direction of the second group of antennas on the whole antenna array and a degree of impact on the second group of antennas. In addition, $W_2$ represents the phase rotation of the second group of antennas relative to the first group of antennas by using the phase rotation factor in the matrix B. It should be noted that, all the foregoing preset values may be set according to a specific requirement. The foregoing describes composition of the matrices $W_1$ and $W_2$. In a specific implementation process, values of $W_1$ may be limited to a finite set. This may be implemented by limiting a value of $\Omega$, a quantity of values of G, and/or a quantity of values of G'. Likewise, values of $W_2$ may be limited to a finite set. This may be implemented by limiting quantities of values of the matrices A and B. For example, for the matrix A, the quantity of values of the matrix A may be limited by limiting quantities of values of $\lambda_i$ and $\phi_i$. For example, for the matrix B, the quantity of values of the matrix B may be limited by limiting quantities of values of $\gamma_i$ and $\varphi_i$. In addition, after the antenna array is selected, the value of cross polarization leakage and the cross polarization factor may also be determined with the antenna array, and do not need to be changed frequently. In addition, a quantity of values of the phase rotation factor may be limited. Because the values of $W_1$ and $W_2$ are limited to respective finite sets, a computation amount in determining the precoding matrix may be controlled effectively.

In the structure of $W_2$ described above, elements in the matrix A and the matrix B may be selected from a same group of preset values, where the group of preset values may be the elements in $\delta$ or $\sigma$ described above. As described above, both the matrix A and the matrix B are column vectors. A quantity of elements included in the column vector A may be different from a quantity of elements included in the column vector B. More accurately, the quantity of the elements included in the column vector A is equal to the quantity of beams in the matrix G; and the quantity of elements included in the column vector B is equal to the quantity of beams in the matrix G.

After $W_1$ and $W_2$ are selected, the selected $W_1$ and $W_2$ may be fed back by using $PMI_{W_1}$ and $PMI_{W_2}$ respectively, where a feedback period of $PMI_{W_1}$ is longer than a feedback period of $PMI_{W_2}$. Therefore, a feedback frequency of $PMI_{W_2}$ is lower than a feedback frequency of $PMI_{W_2}$.

The basic codebook provided by this embodiment of the present invention is described in detail above with reference to the cross polarization antenna array. However, the description using the cross polarization antenna array is merely intended to present the structure of the basic codebook more visually, but not intended to limit an object to which the basic codebook is applied. Therefore, the basic codebook provided by this embodiment of the present invention is also applicable to other types of antenna arrays, for example, including but not limited to a densely-arranged antenna array that is applicable to a MIMO system same as the cross polarization antenna array. In addition, a single-polarization antenna array (for example, as shown in FIG. 5B and FIG. 5C), a circular antenna array, or the like may be used. When other types of antenna arrays are used, the cross polarization leakage value, a second cross polarization leakage factor, and/or the phase rotation factor may not be set any longer.

In addition, the antenna mentioned in the process of describing the basic codebook may be understood as a physical antenna or may be understood as an antenna port. One antenna port may correspond to one or several physical antennas. When one antenna port corresponds to several physical antennas, a signal transmitted by the antenna port is formed by combining signals transmitted by the several physical antennas.

As described above, in the technical solution provided by this embodiment of the present invention, the existing two-level codebook is improved. In a specific implementation process, the base station may interact with the terminal device to negotiate a codebook solution used in a communication process. For example, the used codebook solution may be indicated by using a radio resource control (Radio Resource Control, RRC) message. When the RRC message transmitted by the base station to the terminal device carries an indication of an existing codebook solution, it indicates that the base station instructs the terminal device to use the existing codebook solution. When the message carries an indication of the codebook solution provided by this embodiment of the present invention, it indicates that the base station instructs the terminal device to use the codebook solution provided by this embodiment of the present invention.

In conclusion, this embodiment of the present invention provides the following codebook structure:

$W=W_1W_2$, where W is the basic codebook, $W_1$ is the beam codebook, the quantity of rows in the beam codebook is equal to the quantity of antennas of the base station, and $W_2$ is the weighted combining codebook;

$$W_1 = \begin{bmatrix} G & 0 \\ 0 & G' \end{bmatrix},$$

G corresponds to the first group of antennas in the antenna array, and G' corresponds to the second group of antennas in the antenna array; and $$W_2 = \begin{bmatrix} A \\ B \end{bmatrix},$$

matrices A and B are both column vectors, quantities of non-zero elements included in the column vectors A and B are both greater than 1, an order of the column vector A is equal to a quantity of column vectors in the matrix G, and an order of the column vector B is equal to a quantity of column vectors in the matrix G'.

Optionally, the column vectors in G and G' may be selected from a same column vector set (the column vector set may also be referred to as a beam set), or may be selected from different column vector sets. Orders of the column vectors from the same column vector set are the same. Orders of the column vectors from different column vector sets may be the same or may be different. Column vectors in the same column vector set may be mutually orthogonal or may not be orthogonal.

Optionally, G may correspond to the first group of antennas in the antenna array, and G' may correspond to the second group of antennas in the antenna array. Further, polarization directions of all antennas in each group of antennas are the same, and the polarization direction of the first group of antennas and the polarization direction of the second group of antennas may be the same or may be different.

In the technical solution provided by this embodiment of the present invention, multiple beams are selected for each group of antennas, weighted combining is performed to construct a new beam, and the group of antennas is weighted by using the new beam. The constructed new beam can simulate real channel conditions more precisely, and enhance precision of precoding.

Figure 6:
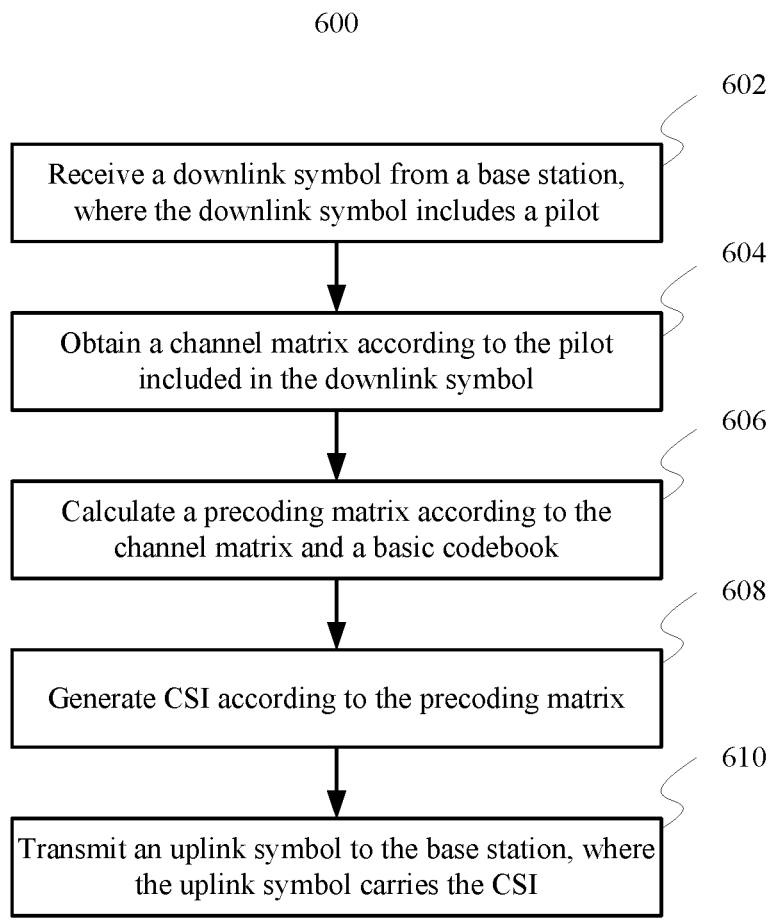
FIG. 6 is an illustrative flowchart of a CSI feedback method according to an embodiment of the present invention.

FIG. 6 is an illustrative flowchart of a CSI feedback method 600 according to an embodiment of the present invention. In a specific implementation process, for example, the method 600 may be performed by a terminal device, but this is not limited.

Step 602: Receive a downlink symbol from a base station, where the downlink symbol includes a pilot.

Step 604: Obtain a channel matrix based on the pilot included in the downlink symbol.

Step 606: Calculate a precoding matrix based on the channel matrix and a basic codebook.

Step 608: Generate CSI based on the precoding matrix.

Step 610: Transmit an uplink symbol to the base station, where the uplink symbol carries the CSI.

Specific execution details and specific features in the foregoing steps are already described in detail above with reference to FIG. 4 to FIG. 5C, and therefore are not further described herein.

Figure 7:
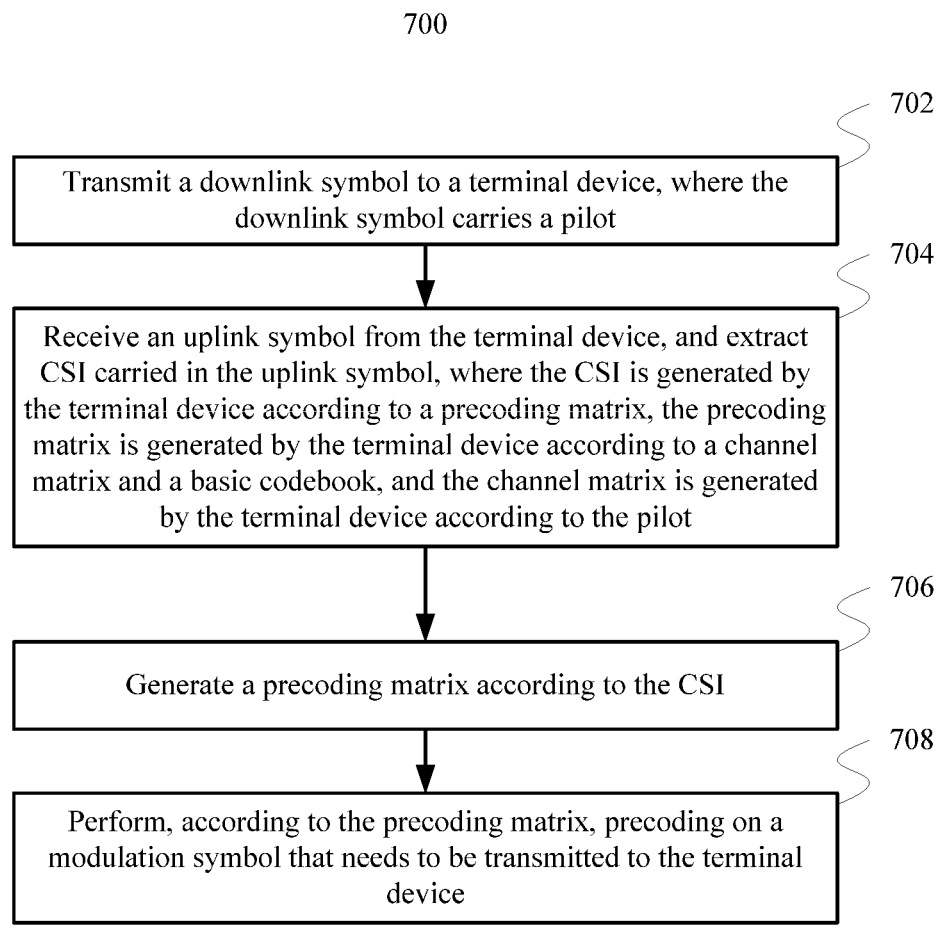
FIG. 7 is an illustrative flowchart of a precoding method according to an embodiment of the present invention.

FIG. 7 is an illustrative flowchart of a precoding method 700 according to an embodiment of the present invention. In a specific implementation process, for example, the method 700 may be performed by a base station, but this is not limited.

Step 702: Transmit a downlink symbol to a terminal device, where the downlink symbol 406 carries a pilot.

Step 704: Receive an uplink symbol from the terminal device, and extract CSI carried in the uplink symbol, where the CSI is generated by the terminal device based on a precoding matrix, the precoding matrix is generated by the terminal device based on a channel matrix and a basic codebook, and the channel matrix is generated by the terminal device based on the pilot.

Step 706: Generate a precoding matrix based on the CSI.

Step 708: Perform, based on the precoding matrix, precoding on a modulation symbol that needs to be transmitted to the terminal device. As described above, in different scenarios (for example, SU-MIMO and MU-MIMO), precoding matrices used in the precoding processes are different.

Specific execution details and specific features in the foregoing steps are already described in detail above with reference to FIG. 4 to FIG. 5C, and therefore are not further described herein.

For content about the process of generating the CSI and the basic codebook, refer to the foregoing descriptions with reference to FIG. 4 and FIG. 5A to FIG. 5C.

Figure 8:
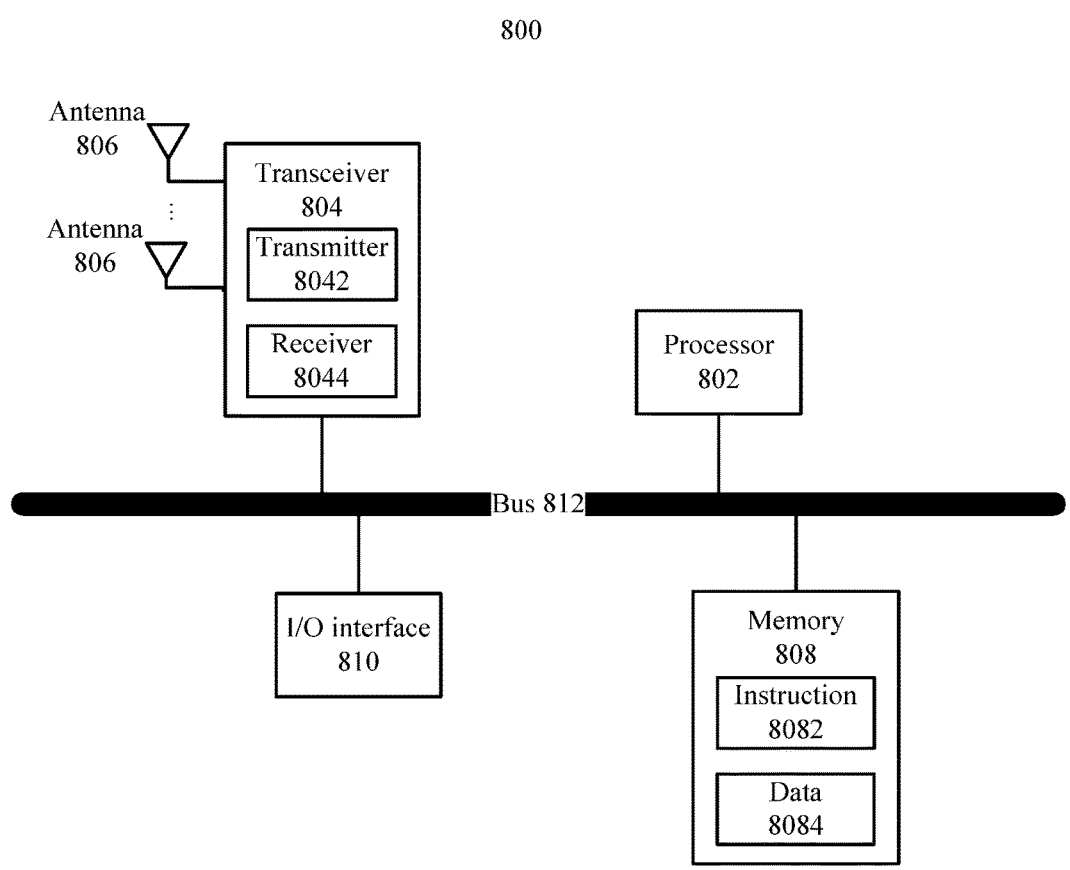
FIG. 8 is a schematic diagram of a hardware structure of a terminal device according to an embodiment of the present invention.

FIG. 8 is a schematic diagram of a hardware structure of a terminal device 800 according to an embodiment of the present invention. As shown in FIG. 8, the terminal device 800 includes a processor 802, a transceiver 804, multiple antennas 806, a memory 808, an I/O (input/output, Input/Output) interface 810, and a bus 812. The transceiver 804 further includes a transmitter 8042 and a receiver 8044, and the memory 808 is further configured to store an instruction 8082 and data 8084. In addition, the processor 802, the transceiver 804, the memory 808, and the I/O interface 810 are communicatively connected to each other by the bus 812, and the multiple antennas 806 are connected to the transceiver 804.

The processor 802 may be a general purpose processor, for example, including but not limited to a Central Processing Unit (CPU), or may be a dedicated processor, for example, including but not limited to a Digital Signal Processor (DSP), an Application-Specific Integrated Circuit (ASIC), or a Field Programmable Gate Array (FPGA). In addition, the processor 802 may be a combination of multiple processors. The processor 802 is configured to perform, for example, an operation performed by the CSI generation module 4044 of the terminal device 404 shown in FIG. 4, and steps 604 to 608 in the method 600 shown in FIG. 6. The processor 802 may be a processor specially designed to perform the foregoing operation and/or step, or may perform the foregoing operation and/or step by reading and executing the instruction 8082 stored in the memory 808. The processor 802 may need to use the data 8084 in a process of performing the foregoing operation and/or step.

The transceiver 804 includes the transmitter 8042 and the receiver 8044. The transmitter 8042 is configured to transmit an uplink signal to the base station by using at least one of the multiple antennas 806. The receiver 8044 is configured to receive a downlink signal from the base station by using at least one of the multiple antennas 806. The transmitter 8042 is specifically configured to perform, by using at least one of the multiple antennas 806, for example, the operation performed by the transmission module 4046 of the terminal device 404 shown in FIG. 4, and step 610 in the method 600 shown in FIG. 6. The receiver 8044 is specifically configured to perform, by using at least one of the multiple antennas 806, for example, the operation performed by the receiving module 4042 of the terminal device 404 shown in FIG. 4, and step 602 in the method 600 shown in FIG. 6.

The memory 808 may be any type of storage medium, for example, a Random Access Memory (RAM), a Read-Only Memory (ROM), a Non-Volatile Random Access Memory (NVRAM), a Programmable Read-Only Memory (PROM), an Erasable Programmable Read-Only Memory (EPROM), an Electrically Erasable PROM (EEPROM), a flash memory, an optical memory, or a register. The memory 808 is specifically configured to store the instruction 8082 and the data 8084. The processor 802 may perform the foregoing operation and/or step by reading and executing the instruction 8082 stored in the memory 808, and may need to use the data 8084 in the process of performing the foregoing operation and/or step.

The I/O interface 810 is configured to receive an instruction and/or data from a peripheral, and output an instruction and/or data to the peripheral.

It should be noted that, in a specific implementation process, the terminal device 800 may further include other hardware components. The components are not listed one by one in the specification.

Figure 9:
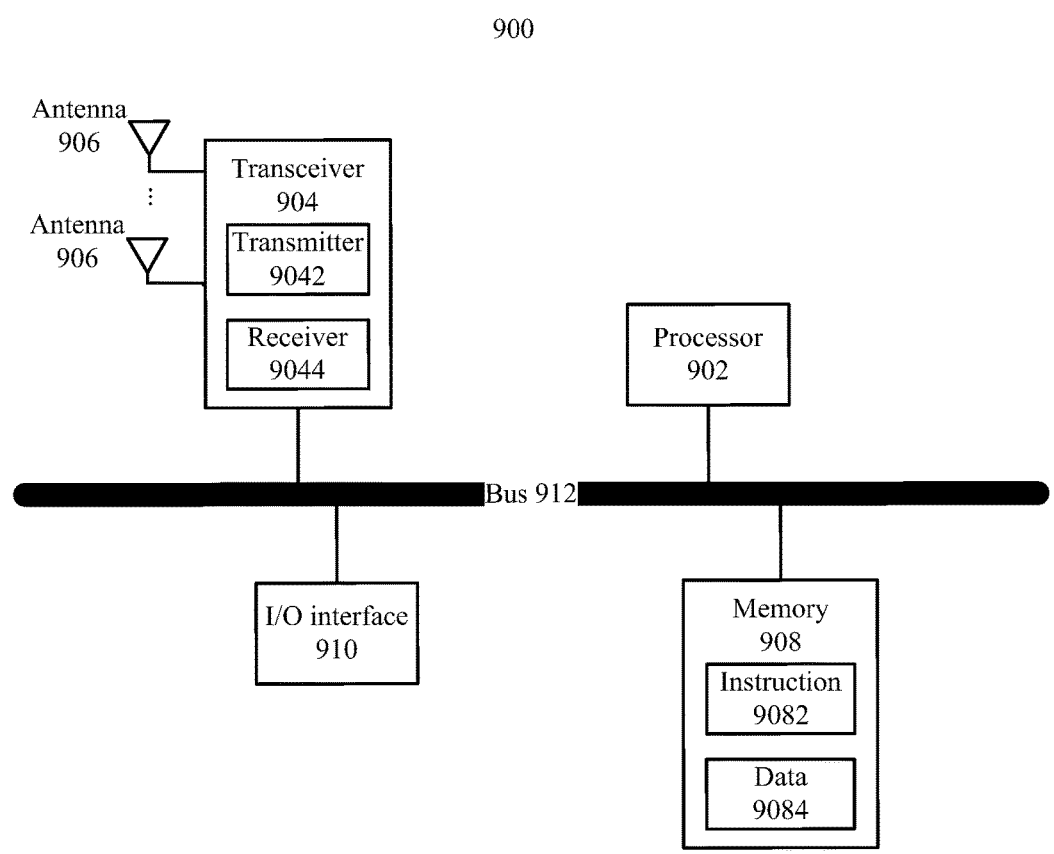
FIG. 9 is a schematic diagram of a hardware structure of a base station according to an embodiment of the present invention.

FIG. 9 is a schematic diagram of a hardware structure of a base station 900 according to an embodiment of the present invention. As shown in FIG. 9, the base station 900 includes a processor 902, a transceiver 904, multiple antennas 906, a memory 908, an I/O interface 910, and a bus 912. The transceiver 904 further includes a transmitter 9042 and a receiver 9044, and the memory 908 is further configured to store an instruction 9082 and data 9084. In addition, the processor 902, the transceiver 904, the memory 908, and the I/O interface 910 are communicatively connected to each other by the bus 912, and the multiple antennas 906 are connected to the transceiver 904.

The processor 902 may be a general purpose processor, for example, including but not limited to a CPU, or may be a dedicated processor, for example, including but not limited to a DSP, an ASIC, an FPGA, or the like. In addition, the processor 902 may be a combination of multiple processors. The processor 902 is configured to perform, for example, an operation performed by the precoding module 4026 of the base station 402 shown in FIG. 4, and steps 706 to 708 in the method 700 shown in FIG. 7. The processor 902 may be a processor specially designed to perform the foregoing operation and/or step, or may perform the foregoing operation and/or step by reading and executing the instruction 9082 stored in the memory 908. The processor 902 may need to use the data 9084 in a process of performing the foregoing operation and/or step.

The transceiver 904 includes the transmitter 9042 and the receiver 9044. The transmitter 9042 is configured to transmit a downlink signal to a terminal device by using at least one of the multiple antennas 906. The receiver 9044 is configured to receive an uplink signal from the terminal device by using at least one of the multiple antennas 906. The transmitter 9042 is specifically configured to perform, by using at least one of the multiple antennas 906, for example, the operation performed by the transmission module 4022 of the base station 402 shown in FIG. 4, and step 702 in the method 700 shown in FIG. 7. The receiver 9044 is specifically configured to perform, by using at least one of the multiple antennas 906, for example, the operation performed by the receiving module 4024 of the base station 402 shown in FIG. 4, and step 704 in the method 700 shown in FIG. 7.

The memory 908 may be any type of storage medium, for example, a RAM, a ROM, an NVRAM, a PROM, an EPROM, an EEPROM, a flash memory, an optical memory, or a register. The memory 908 is specifically configured to store the instruction 9082 and the data 9084. The processor 902 may perform the foregoing operation and/or step by reading and executing the instruction 9082 stored in the memory 908, and may need to use the data 9084 in the process of performing the foregoing operation and/or step.

The I/O interface 910 is configured to receive an instruction and/or data from a peripheral, and output an instruction and/or data to the peripheral.

It should be noted that, in a specific implementation process, the base station 900 may further include other hardware components. The components are not listed one by one in the specification.

All or some of the steps of the foregoing methods may be implemented by a program instructing relevant hardware. The program may be stored in a computer readable storage medium. The storage medium includes: a ROM, a RAM, and an optical disc.

In conclusion, the foregoing descriptions are merely examples of embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A channel state information (CSI) feedback method for a terminal, comprising:
  receiving a downlink symbol from a base station, wherein the downlink symbol comprises a pilot;
  obtaining a channel matrix based on the pilot of the downlink symbol;
  calculating a precoding matrix based on the channel matrix and a basic codebook;
  generating CSI based on the precoding matrix; and
  transmitting an uplink symbol to the base station, wherein the uplink symbol includes the CSI and the base station adjusts a radio signal to be transmitted to the terminal based on the CSI, and wherein
  an antenna array is configured for the base station, and the basic codebook is:

$$W = W_1 W_2,$$

wherein W is the basic codebook, $W_1$ is a beam codebook, a quantity of rows in the beam codebook is equal to a quantity of antennas of the base station, and $W_2$ is a weighted combining codebook, wherein $$W_1 = \begin{bmatrix} G & 0 \\ 0 & G' \end{bmatrix},$$

and
  G corresponds to a first group of antennas in the antenna array, and G' corresponds to a second group of antennas in the antenna array and $$W_2 = \begin{bmatrix} A \\ B \end{bmatrix},$$

and wherein
  matrices A and B are both column vectors, quantities of non-zero elements comprised in the column vectors A and B are both greater than 1, a quantity of elements comprised in the column vector A is equal to a quantity of column vectors in a matrix G, and a quantity of elements comprised in the column vector B is equal to a quantity of column vectors in a matrix G'.

2. The method according to claim 1, wherein the antenna array comprises $N_1 \times N_2$ cross polarization antenna pairs arranged in $N_1$ rows and $N_2$ columns antennas both the first group of antennas and the second group of antennas comprise $N_1 N_2$ antennas, wherein $N_1$ and $N_2$ refer to integers and $$G = [g_1 g_2 \ldots g_{M_1}], g_i \in \Omega, 1 \le i \le M_1, 1 \le M_1 \le L, \text{ and}$$

$$G' = [g_1' g_2' \ldots g_{M_2}'], g_i' \in \Omega, 1 \le i \le M_2, 1 \le M_2 \le L,$$

wherein $\Omega$ is a preset group of $(N_1 N_2 \times 1)^{th}$-order vectors, the vectors are mutually orthogonal or not orthogonal, L is a quantity of vectors and $L \ge 2N_1 N_2$, the column vectors in G are mutually orthogonal or not orthogonal, and the column vectors in G' are mutually orthogonal or not orthogonal;

$$W_2 = \frac{1}{\sqrt{1+\tau^2}} \begin{bmatrix} A \\ B \end{bmatrix}, \tau > 0,$$

wherein $\tau$ is a value of cross polarization leakage between a polarization direction of the second group of antennas and a polarization direction of the first group of antennas;

$$A = \begin{bmatrix} \beta_1 \\ \beta_2 \\ \vdots \\ \beta_{M_1} \end{bmatrix}, \beta_i \in \delta, 1 \le i \le M_1, \text{ and}$$

-continued $$\delta = \{\lambda_i e^{j\phi_i}, 0 \le \lambda_i \le 1, 0 \le \phi_i < 2\pi, M_1 \le i\},$$

wherein $\lambda_i$ and $\phi_i$ are preset values, and $$B = \tau e^{j\theta} \begin{vmatrix} \eta_2 \\ \vdots \end{vmatrix}, 0 \le \theta < 2\pi, \eta_i \in \sigma, 1 \le i \le M_2, \text{ and}$$

$$\sigma = \{\gamma_i e^{j\varphi_i}, 0 \le \gamma_i \le 1, 0 \le \varphi_i < 2\pi, M_2 \le i\},$$

wherein $\theta$ is an angle of phase rotation of the second group of antennas relative to the first group of antennas, $\gamma_i$ and $\varphi_i$ are preset values, and $\Sigma_{i=1}^{M_1} |\beta_i|^2 = 1$.

3. The method according to claim 1, wherein G and G' are the same or different; and A and B are the same or different.

4. A precoding method, comprising:
receiving an uplink symbol from a terminal device, and extracting channel state information (CSI) in the uplink symbol, wherein the CSI is generated by the terminal device based on a precoding matrix, the precoding matrix is generated by the terminal device based on a channel matrix and a basic codebook, and the channel matrix is generated by the terminal device based on the pilot;
generating a precoding matrix based on the extracted CSI; and
performing, based on the generated precoding matrix, precoding on a modulation symbol to adjust a radio signal that needs to be transmitted to the terminal device; wherein
an antenna array is configured for the base station, and the basic codebook is:

$$W = W_1 W_2,$$

wherein W is the basic codebook, $W_1$ is a beam codebook, a quantity of rows in the beam codebook is equal to a quantity of antennas of the base station, and $W_2$ is a weighted combining codebook; and wherein $$W_1 = \begin{bmatrix} G & 0 \\ 0 & G' \end{bmatrix},$$

G corresponds to a first group of antennas in the antenna array, and G' corresponds to a second group of antennas in the antenna array; and wherein $$W_2 = \begin{bmatrix} A \\ B \end{bmatrix},$$

matrices A and B are both column vectors, quantities of non-zero elements comprised in the column vectors A and B are both greater than 1, a quantity of elements comprised in the column vector A is equal to a quantity of column vectors in a matrix G, and a quantity of elements comprised in the column vector B is equal to a quantity of column vectors in a matrix G'.

5. The method according to claim 4, wherein the antenna array comprises $N_1 \times N_2$ cross polarization antenna pairs arranged in $N_1$ rows and $N_2$ columns antennas, both the first group of antennas and the second group of antennas comprise $N_1 N_2$ antennas, wherein $N_1$ and $N_2$ refer to integers and $$G = [g_1 g_2 \ldots g_{M_1}], g_i \in \Omega, 1 \le i \le M_1, 1 \le M_1 \le L, \text{ and}$$

$$G' = [g_1' g_2' \ldots g_{M_2}'], g_i \in \Omega, 1 \le i \le M_2, 1 \le M_2 \le L,$$

wherein $\Omega$ is a preset group of $(N_1 N_2 \times 1)^{th}$-order vectors, the vectors are mutually orthogonal or not orthogonal, L is a quantity of vectors and $L \ge 2N_1 N_2$, the column vectors in G are mutually orthogonal or not orthogonal, and the column vectors in G' are mutually orthogonal or not orthogonal;

$$W_2 = \frac{1}{\sqrt{1+\tau^2}} \begin{bmatrix} A \\ B \end{bmatrix}, \tau > 0,$$

wherein $\tau$ is a value of cross polarization leakage between a polarization direction of the second group of antennas and a polarization direction of the first group of antennas;

$$A = \begin{bmatrix} \beta_1 \\ \beta_2 \\ \vdots \\ \beta_{M_1} \end{bmatrix}, \beta_i \in \delta, 1 \le i \le M_1, \text{ and}$$

$$\delta = \{\lambda_i e^{j\phi_i}, 0 \le \lambda_i \le 1, 0 \le \phi_i < 2\pi, M_1 \le i\},$$

wherein $\lambda_i$ and $\phi_i$ are preset values, and $\Sigma_{i=1}^{M_1} |\beta_i|^2 = 1$; and $$B = \tau e^{j\theta} \begin{vmatrix} \eta_2 \\ \vdots \end{vmatrix}, 0 \le \theta < 2\pi, \eta_i \in \sigma, 1 \le i \le M_2, \text{ and}$$

$$\sigma = \{\gamma_i e^{j\varphi_i}, 0 \le \gamma_i \le 1, 0 \le \varphi_i < 2\pi, M_2 \le i\},$$

wherein $\theta$ is an angle of phase rotation of the second group of antennas relative to the first group of antennas, $\gamma_i$ and $\varphi_i$ are preset values, and $\Sigma_{i=1}^{M_2} |\eta_i|^2 = 1$.

6. The method according to claim 4, wherein G and G' are the same or different and A and B are the same or different.

7. A terminal device, comprising:
a receiving module, configured to receive a downlink symbol from a base station;
a channel state information (CSI) generation module, configured to obtain a channel matrix according to a pilot comprised in the downlink symbol, calculate a precoding matrix based on the channel matrix and a basic codebook, and generate CSI based on the precoding matrix; and
a transmission module, configured to transmit an uplink symbol to the base station, wherein the uplink symbol includes the CSI that is used by the base station to adjust a radio signal to be transmitted to the terminal device; wherein
an antenna array is configured for the base station, and the basic codebook is:

$$W = W_1 W_2,$$

wherein W is the basic codebook, $W_1$ is a beam codebook, a quantity of rows in the beam codebook is equal to a quantity of antennas of the base station, and $W_2$ is a weighted combining codebook; wherein $$W_1 = \begin{bmatrix} G & 0 \\ 0 & G' \end{bmatrix},$$

G corresponds to a first group of antennas in the antenna array, and G' corresponds to a second group of antennas in the antenna array; and wherein $$W_2 = \begin{bmatrix} A \\ B \end{bmatrix},$$

matrices A and B are both column vectors, quantities of non-zero elements comprised in the column vectors A and B are both greater than 1, a quantity of elements comprised in the column vector A is equal to a quantity of column vectors in a matrix G, and a quantity of elements comprised in the column vector B is equal to a quantity of column vectors in a matrix G'.

8. The terminal device according to claim 7, wherein the antenna array comprises $N_1 \times N_2$ cross polarization antenna pairs arranged in $N_1$ rows and $N_2$ columns antennas, both the first group of antennas and the second group of antennas comprise $N_1 N_2$ antennas, wherein $N_1$ and $N_2$ refer to integers and $$G = [g_1 g_2 \ldots g_{M_1}], g_i \in \Omega, 1 \le i \le M_1, 1 \le M_1 \le L, \text{ and}$$

$$G' = [g_1' g_2' \ldots g_{M_2}'], g_i' \in \Omega, 1 \le i \le M_2, 1 \le M_2 \le L,$$

wherein $\Omega$ is a preset group of $(N_1 N_2 \times 1)^{th}$-order vectors, the vectors are mutually orthogonal or not orthogonal, L is a quantity of vectors and $L \ge 2N_1 N_2$, the column vectors in G are mutually orthogonal or not orthogonal, and the column vectors in G' are mutually orthogonal or not orthogonal; and wherein $$W_2 = \frac{1}{\sqrt{1+\tau^2}} \begin{bmatrix} A \\ B \end{bmatrix}, \tau > 0,$$

wherein $\tau$ is a value of cross polarization leakage between a polarization direction of the second group of antennas and a polarization direction of the first group of antennas;

$$A = \begin{bmatrix} \beta_1 \\ \beta_2 \\ \vdots \\ \beta_{M_1} \end{bmatrix}, \beta_i \in \delta, 1 \le i \le M_1, \text{ and}$$

$$\delta = \{\lambda_i e^{j\phi_i}, 0 \le \lambda_i \le 1, 0 \le \phi_i < 2\pi, M_1 \le i\},$$

wherein $\lambda_i$ and $\phi_i$ are preset values, and $\sum_{i=1}^{M_1} |\beta_i|^2 = 1$; and $$B = \tau e^{j\theta} \begin{bmatrix} \eta_2 \\ \vdots \end{bmatrix}, 0 \le \theta < 2\pi, \eta_i \in \sigma, 1 \le i \le M_2, \text{ and}$$

$$\sigma = \{\gamma_i e^{j\varphi_i}, 0 \le \gamma_i \le 1, 0 \le \varphi_i < 2\pi, M_2 \le i\},$$

wherein $\theta$ is an angle of phase rotation of the second group of antennas relative to the first group of antennas, $\gamma_i$ and $\varphi_i$ are preset values, and $\sum_{i=1}^{M_2} |\eta_i|^2 = 1$.

9. A base station, comprising:
a transmission module, configured to transmit a downlink symbol to a terminal device, wherein the downlink symbol comprises a pilot;
a receiving module, configured to receive channel state information (CSI) from the terminal device, wherein the CSI is generated by the terminal device based on a precoding matrix, the precoding matrix is generated by the terminal device based on a channel matrix and a basic codebook, and the channel matrix is generated by the terminal device based on the pilot; and
a precoding module, configured to generate a precoding matrix based on the received CSI, and perform, based on the precoding matrix, precoding on a modulation symbol to adjust a radio signal that needs to be transmitted to the terminal device; wherein
an antenna array is configured for the base station, and the basic codebook is:

$$W = W_1 W_2,$$

wherein W is the basic codebook, $W_1$ is a beam codebook, a quantity of rows in the beam codebook is equal to a quantity of antennas of the base station, and $W_2$ is a weighted combining codebook; and wherein $$W_1 = \begin{bmatrix} G & 0 \\ 0 & G' \end{bmatrix},$$

G corresponds to a first group of antennas in the antenna array, and G' corresponds to a second group of antennas in the antenna array; and wherein $$W_2 = \begin{bmatrix} A \\ B \end{bmatrix},$$

matrices A and B are both column vectors, quantities of non-zero elements comprised in the column vectors A and B are both greater than 1, a quantity of elements comprised in the column vector A is equal to a quantity of column vectors in a matrix G, and a quantity of elements comprised in the column vector B is equal to a quantity of column vectors in a matrix G'.

10. The base station according to claim 9, wherein the antenna array comprises $N_1 \times N_2$ cross polarization antenna pairs arranged in $N_1$ rows and $N_2$ columns antennas, both the first group of antennas and the second group of antennas comprise $N_1 N_2$ antennas, wherein $N_1$ and $N_2$ refer to integers and $$G = [g_1 g_2 \ldots g_{M_1}], g_i \in \Omega, 1 \le i \le M_1, 1 \le M_1 \le L, \text{ and}$$

$$G' = [g_1' g_2' \ldots g_{M_2}'], g_i' \in \Omega, 1 \le i \le M_2, 1 \le M_2 \le L,$$

wherein $\Omega$ is a preset group of $(N_1 N_2 \times 1)^{th}$-order vectors, the vectors are mutually orthogonal or not orthogonal, L is a quantity of vectors and $L \ge 2N_1 N_2$, the column vectors in G are mutually orthogonal or not orthogonal, and the column vectors in G' are mutually orthogonal or not orthogonal;

$$W_2 = \frac{1}{\sqrt{1+\tau^2}} \begin{bmatrix} A \\ B \end{bmatrix}, \tau > 0,$$

wherein τ is a value of cross polarization leakage between a polarization direction of the second group of antennas and a polarization direction of the first group of antennas;

$$A = \begin{bmatrix} \beta_1 \\ \beta_2 \\ \vdots \\ \beta_{M_1} \end{bmatrix}, \beta_i \in \delta, 1 \le i \le M_1, \text{ and}$$

$$\delta = \{\lambda_i e^{j\phi_i}, 0 \le \lambda_i \le 1, 0 \le \phi_i < 2\pi, M_1 \le i\},$$

wherein $\lambda_i$ and $\phi_i$ are preset values, and $\Sigma_{i=1}^{M_1}|\beta_i|^2=1$; and $$B = \tau e^{j\theta} \begin{vmatrix} \eta_1 \\ \eta_2 \\ \vdots \\ \eta_{M_2} \end{vmatrix}, 0 \le \theta < 2\pi, \eta_i \in \sigma, 1 \le i \le M_2,$$

and $$\sigma = \{\gamma_i e^{j\varphi_i}, 0 \le \gamma_i \le 1, 0 \le \varphi_i < 2\pi, M_2 \le i\},$$

wherein θ is an angle of phase rotation of the second group of antennas relative to the first group of antennas, $\gamma_i$ and $\varphi_i$ are preset values, and $\Sigma_{i=1}^{M_2}|\eta_i|^2=1$.

* * * * *